(12) United States Patent
Hunt

(10) Patent No.: US 7,448,502 B2
(45) Date of Patent: Nov. 11, 2008

(54) MEDIA STORAGE ORGANIZER AND METHOD FOR USING SAME

(75) Inventor: Thomas Hunt, Carlsbad, CA (US)

(73) Assignee: Spectrum Concepts, Inc., Carlsbad, CA (US)

( * ) Notice: Subject to any disclaimer, the term of this patent is extended or adjusted under 35 U.S.C. 154(b) by 563 days.

(21) Appl. No.: 11/035,947

(22) Filed: Jan. 14, 2005

(65) Prior Publication Data

US 2006/0157429 A1 Jul. 20, 2006

(51) Int. Cl.
*A47G 29/00* (2006.01)
(52) U.S. Cl. .......................................... 211/40
(58) Field of Classification Search ................. 211/40, 211/42, 49.1, 183, 184, 134, 135; 312/9.55, 312/9.1, 9.47, 9.53
See application file for complete search history.

(56) References Cited

U.S. PATENT DOCUMENTS

| | | | | |
|---|---|---|---|---|
| 3,471,030 A | * | 10/1969 | Nettekoven | 211/40 |
| 3,603,460 A | * | 9/1971 | Notes | 211/40 |
| 3,623,615 A | * | 11/1971 | Kawachi | 211/40 |
| 3,786,927 A | * | 1/1974 | Manheim | 211/4 |
| 4,312,548 A | * | 1/1982 | Posso | 312/9.52 |
| 4,793,665 A | * | 12/1988 | King | 312/9.52 |
| 5,415,298 A | * | 5/1995 | Callahan et al. | 211/40 |
| 5,584,398 A | * | 12/1996 | Lin | 211/40 |
| RE35,761 E | * | 4/1998 | Dardashti | 211/40 |
| 5,740,924 A | * | 4/1998 | Hunt | 211/40 |
| 5,788,088 A | * | 8/1998 | Kao | 211/40 |
| 6,161,704 A | * | 12/2000 | Stravitz | 211/45 |
| 6,279,757 B1 | * | 8/2001 | Hayoun | 211/40 |
| 6,308,839 B1 | * | 10/2001 | Steinberg et al. | 211/40 |
| 6,332,546 B1 | * | 12/2001 | Hunt | 211/40 |
| 6,648,150 B2 | * | 11/2003 | Hartstone | 211/40 |
| 6,758,346 B2 | * | 7/2004 | Kollegian | 211/40 |
| 6,994,222 B2 | * | 2/2006 | Hunt | 211/40 |

* cited by examiner

*Primary Examiner*—Jennifer E. Novosad
(74) *Attorney, Agent, or Firm*—Bernard L. Kleinke; Duckor Spradling Metzger & Wynne

(57) ABSTRACT

A media storage organizer and method as disclosed relate to a storage device for attachment to a support structure to hold a collection of media objects in a side-by-side generally upright manner. At least one organizer mount secures a media object support transversely to the support structure and helps the support to move along a path of travel generally parallel to the plane of the media objects. A stop limits the forward movement of the support to a display position. In one embodiment, at lease one retainer may be disposed above the media object support and spaced from an end thereof for engaging a media object to help limit the number of media objects positioned on the media object support. The retainer enables the media object to lean at an angle over the retainer against the support structure while engaging the retainer, thereby providing a gap between two portions of the collection of media objects to facilitate viewing of the faces of a media object at the gap and to facilitate flipping of the media objects about their bottom edges for media object selection purposes.

16 Claims, 17 Drawing Sheets

MEDIA STORAGE ORGANIZER AND METHOD FOR USING SAME

FIELD OF THE INVENTION

The present invention relates in general to a storage organizer for media and methods for using same. The invention more particularly relates to a media storage organizer for attachment to a support structure such as at least one generally upright wall to hold the media objects, and relates to a method for using the organizer.

BACKGROUND ART

There is no admission that the background art disclosed in this section legally constitutes prior art.

In the past, media storage devices for holding media objects have been known. Examples of media objects include compact discs (CDs), digital video discs (DVDs), and the like. These media storage devices have been adapted to allow attachment to at least one generally upright wall in cabinets or other furniture.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein.

DETAILED DESCRIPTION OF CERTAIN EMBODIMENTS OF THE INVENTION

Figure 1:
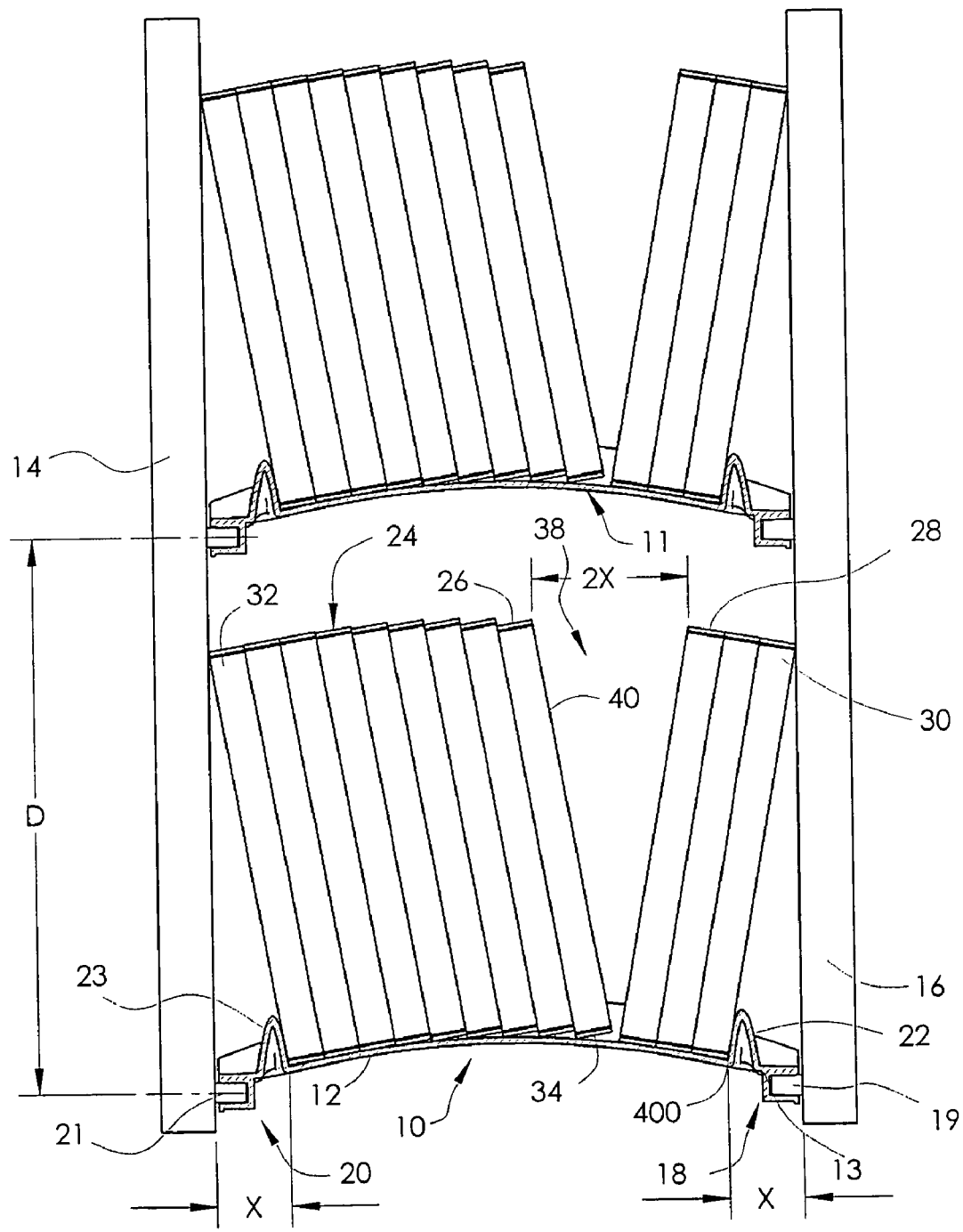
FIG. 1 is a front elevational sectional view of a media storage organizer, which is constructed in accordance with one embodiment of the present invention, and which is illustrated mounted to a support structure along with a like media storage organizer.

It will be readily understood that the components of the embodiments as generally described and illustrated in the drawings herein, could be arranged and designed in a wide variety of different configurations. Thus, the following more detailed description of the embodiments of the system, components and methods of the present invention, as represented in the drawings, is not intended to limit the scope of the invention, as claimed, but is merely representative of the embodiment of the invention.

A media storage organizer and method as disclosed relate to a storage device for attachment to a support structure to hold a collection of media objects in a side-by-side generally upright manner. At least one organizer mount secures a media object support transversely to the support structure and helps the support to move along a path of travel generally parallel to the plane of the media objects. At least one stop limits the forward movement of the support to a display position. In one embodiment, at least one retainer may be disposed above the media object support and spaced from an end thereof for engaging a media object to help limit the number of media objects positioned on the media object support. The retainer enables the media object to lean at an angle over the retainer against the support structure while engaging the retainer, thereby providing a gap between two portions of the collection of media objects to facilitate viewing of the faces of a media object at the gap and to facilitate flipping of the media objects about their bottom edges for media object selection purposes.

According to other embodiments of the present invention, there is provided a method which includes positioning a collection of media objects on a media object support in a generally upright side-by-side manner with the planes of the objects extending generally forwardly. The method further includes moving the organizer forwardly relative to the upright wall in a direction generally parallel to the plane of the media objects to a display position. The disclosed method further includes moving the organizer rearwardly relative to the upright wall in a direction generally parallel to the plane of the media objects to a stored position.

Referring now to FIG. 1, there is shown a media storage organizer or shelf generally indicated at 10, which may be part of a series of vertically spaced apart organizers such as an organizer 11. Only the organizer 10 will now be described in greater detail. The organizer 10 may include a media object support 12 in the form of a plate adapted to be secured to a support structure such as a first upright wall 14 and a second upright wall 16 in a transverse disposition therebetween. The first upright wall 14 and second upright wall 16 may form a part of a cabinet or other piece of furniture. While two side walls are shown by way of example, other portions of the support structure such as a rear wall (not shown) may also be used. Also, while upright walls are disclosed by way of example, other more angular support structures are contemplated and may be used as well.

A collection of media objects 24 such as DVDs or CDs may be placed by a user onto the media object support 12. The collection of media objects 24 may include intermediate media objects 26 and 28 and end media objects 30 and 32. End media objects 30 and 32 may lean directly against the respective upright walls 14 and 16 or other supporting surfaces. Media objects 26 and 28 are disposed generally in the midportion of the media object support 12 separated from the upright walls by other media objects. The media objects such as media object 26 further include a bottom edge such as a bottom edge 34.

A pair of organizer mounts 18 and 20 secure the opposite side edges of the media object support 12 to the respective support structure upright walls 14 and 16. A pair of pins such as a pin 19 projects from the side wall 16 and are slidably received within an elongated groove in the organizer mount 18. Similarly, a pair of pins such as a pin 21 are slidably received within an elongated groove in the organizer mount 20. In this manner, the support 12 may be moved manually by a user between a rearward stored position extending between the walls 14 and 16, and a forward display position extending at least partially forwardly out from between the walls 14 and 16, as hereinafter described in greater detail in connection with other disclosed embodiments of the invention. The support 12 moves along a path of travel generally parallel to the plane of the media objects as hereinafter described in greater detail in connection with other disclosed embodiments of the invention. The media object support 12 is disposed generally horizontally and may be upwardly bowed in shape to help facilitate the leaning or biasing of the media objects toward the support structure. The terms "generally horizontally" are defined to mean an angle of the plane of the support relative to a horizontal plane of between about 0 degrees and about 45 degrees above the horizontal plane.

A first retainer 22 may be disposed on the media object support 12 at a side edge portion 13 of the media object support 12. A second retainer 23 may also be disposed on the media object support 12 at the opposite side edge thereof spaced from where the first retainer 22 may be disposed. Since the first retainer 22 and the second retainer 23 are spaced from the side edges of the media object support 12, the retainers help limit the number of media objects that may be positioned on the media object support 12.

The retainers 22 and 23 are generally V-shaped and project upwardly from the support 12. The retainers 22 and 23 may be integrally connected to the media object support 12, or may be releasably attached thereto as will become apparent to those skilled in the art.

A gap 38 may be formed between adjacent media objects such as media object 26 and media object 28. This gap 38 may be formed due to some of the media objects, such as media object 26, being angled toward the first upright wall 14 and media object 28 being angled toward the second upright wall 16, thereby forming the gap 38 between the two media objects 26 and 28.

Each media object has a media object face, such as media object face indicated at 40 of media object 26. It is desirable to be able to view the media object faces of media objects so that a user may more readily and quickly identify and select a desired media object such as media object 26 by identifying the indicia disposed on the media object face such as the media object face 40, as hereinafter described in greater detail in connection with other embodiments of the invention.

In operation, a user may place a collection of media objects 24 onto the upper surface of the media object support 12 of the media storage organizer 10 mounted between the two upright walls 14 and 16. Moreover, due to the upwardly bowed and curvilinear shape of the media object support 12, the collection of media objects 24 may tend to lean under the force of gravity toward either the first upright wall 14 or the second upright wall 16.

The height of the retainer such as the retainer 22 may be sufficiently tall to limit the lateral movement of the end medial object and is generally substantially less than the height of the media objects such as end media object 30 to enable the end media object such as end media object 30 to lean at an angle over the retainer against the support structure such as the upright wall 16, while engaging the retainer. As a result, a first portion of the collection of media objects rests angularly on the media object support 12 and may be at least partially supported at an angular disposition by the first upright wall 14 or other support surface (not shown), and the remaining portion of the media objects lean against the other wall 16, or other support structure (not shown), to provide the gap 38 between the first portion and the remaining portion of the media objects. The resulting gap 38 facilitates viewing of the faces such as the face 40 of media objects. The gap 38 also facilitates flipping the media objects manually by the user about the media object bottom edges such as a bottom edge 34 of the media object 26 for media object selection purposes.

The retainers 22 and 23 may be horizontally spaced from the inner faces of the respective walls 16 and 14 by a distance X. This may have the result of creating a V-shaped gap 38 between the collection of media objects that has a spacing of 2X at the top edges of the adjacent objects 26 and 28. Therefore, the spacing between the media objects when the user flips the media objects may be controlled at the time of manufacture by modifying the dimension X.

The retainers 22 and 23 each have angular surfaces such as an angular surface 400 on the retainer 22 disposed at an angle that is slightly greater than or substantially equal to the lean angle of the media objects such as media object 30 to limit the lateral movement of the bottom portion such as bottom portion 34 of the collection of media objects 24.

Figure 4:
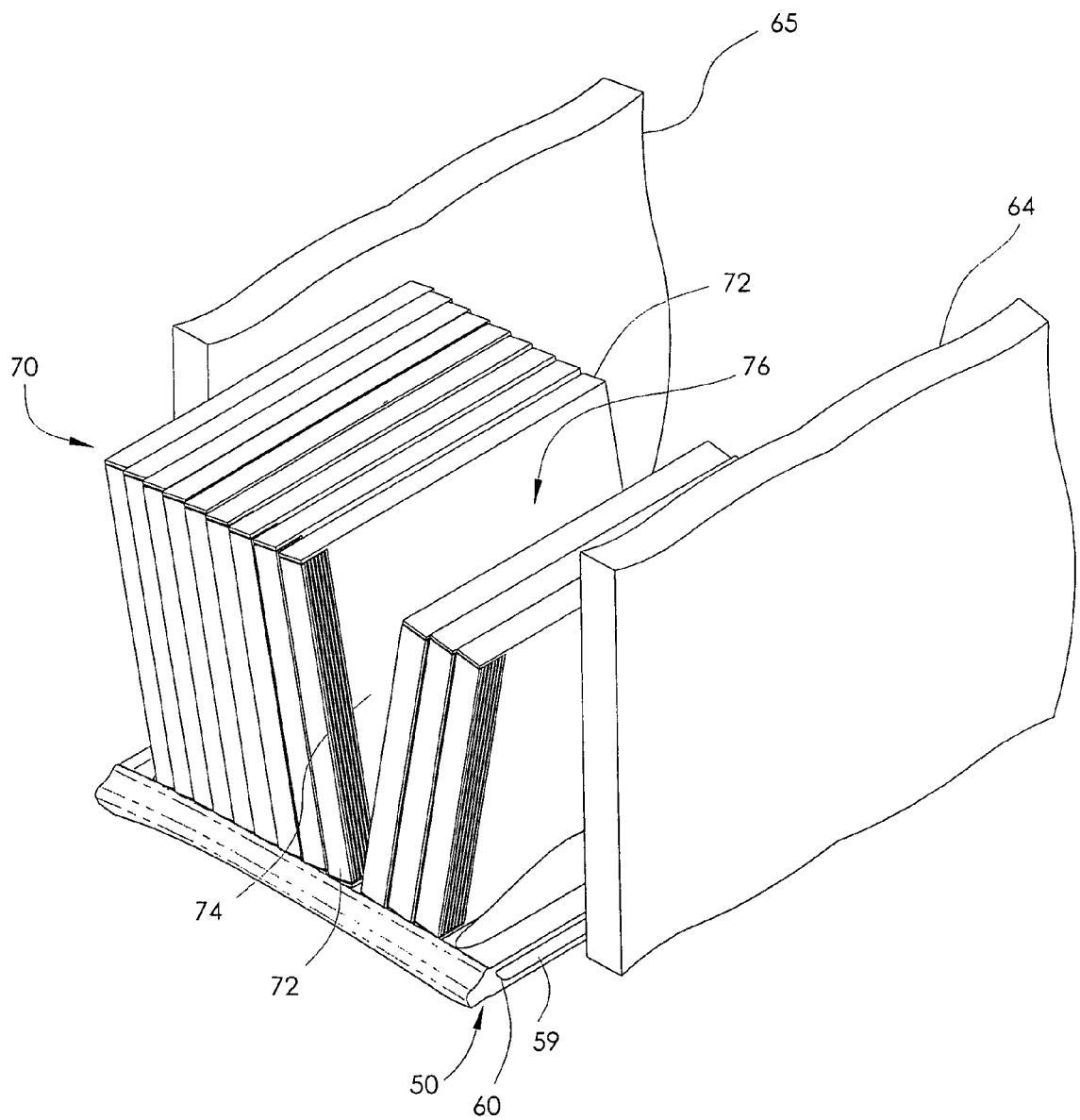
FIG. 4 is a pictorial view of the media storage organizer of FIG. 2, illustrating it in its display position.
Figure 5:
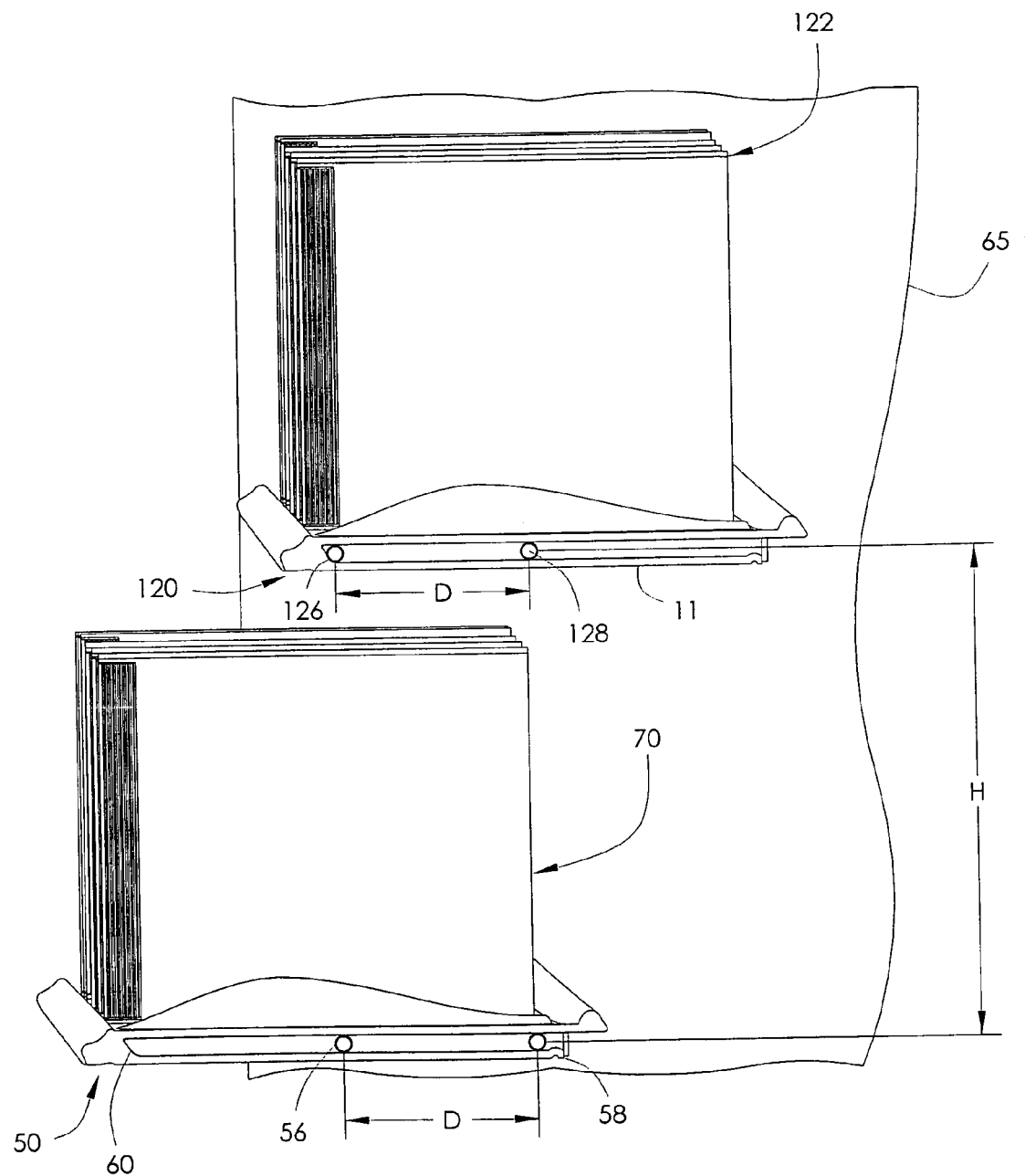
FIG. 5 is a side elevation view of the media storage organizer of FIG. 2 illustrating it in its display position.

In another embodiment of the present invention, and with reference to FIGS. 2, 3, 4 and 5, a media object organizer 50 is similar to the media storage organizer 10, except the organizer 50 has a somewhat different front edge configuration. The organizer 50 may include a media object support 47 which is generally flat and which has a pair of spaced apart upstanding retainers 48 and 49. The retainers are similar to the retainers 22 and 23 of FIG. 1. The organizer 50 may include a first organizer mount in the form of a sliding mechanism shown generally at 52. A similar organizer mount in the form of a second sliding mechanism is shown at 54. The first sliding mechanism 52 may include a first pin 56 and a second pin 58, and are fixed to the inside surface of a support structure such as a wall 64 (FIG. 4). The first pin 56 and the second pin 58 are adapted to be slidably engaged into an elongated groove 59 formed in the side edge of the sliding media object support 50 and open at its rear end. The pins 56 and 58 serve to slidably mount the support 47 to the upright wall 64 of a piece of furniture or the like (not shown). Likewise, the second sliding mechanism partially shown at 54 slidably mounts the opposite side edge of the support 47 to another part of the support structure such as an upright wall 65 (FIGS. 4 and 5).

The organizer 50 includes a rear stop 60 in the form of the front end portion of the elongated groove 59 of the media object support 47 to limit the movement of the support 47 rearwardly to a position between the walls 64 and 65. A front stop 58 (FIG. 5) is in the form of a protuberance at the rear end portion of the elongated groove 59 of the media object support 47 limiting the forward motion of the support 47 to its display position shown in FIGS. 4 and 5. The rear stop 60 and front stop 58 disposed within the elongated groove 59 limit the back and forth path of travel of the media object support 47 between a display position extending outwardly of the support structure as shown in FIGS. 4 and 5, and a storage position within the support structure between the walls 64 and 65 in a manner as indicated by a like organizer 120 shown in FIG. 5 disposed directly above the organizer 50.

In the operation of the media object organizer 50, and with reference to FIG. 4, the media object organizer 50 is slidably mounted between the upright walls 64 and 65. The user may pull manually the sliding media object organizer 50 in a forward direction into its display position so that a collection of media objects 70 may be placed thereon. The organizer 50 may then be pushed rearwardly by the user so that the media objects 70 resting upon the media object support 47 may be confined between the upright walls 64 and 65 for storage purposes.

When the user desires to select and remove a media object such as media object 72 from the organizer 50, the user may pull the support 47 in a forward direction along a generally horizontal path of travel to the display position. In that position, the user can manually flip the media object such as media object 72 about their bottom edges due to a gap 76 which is similar to the gap 38 of FIG. 1. In this manner, the media object face such as a face 74 becomes visible to the user within the gap 76 so that the user may rapidly identify from the indicia (not shown) on the face 74 of the desired media object 72. The media object may then be removed from the sliding media object support 47 for use by the user.

After this operation is complete, the user may then push the sliding media object support 47 rearwardly so that the remaining media objects of the collection 70 of media objects may be stored within the confines of the upright walls 64 and 65 of the organizer support structure.

Figure 2:
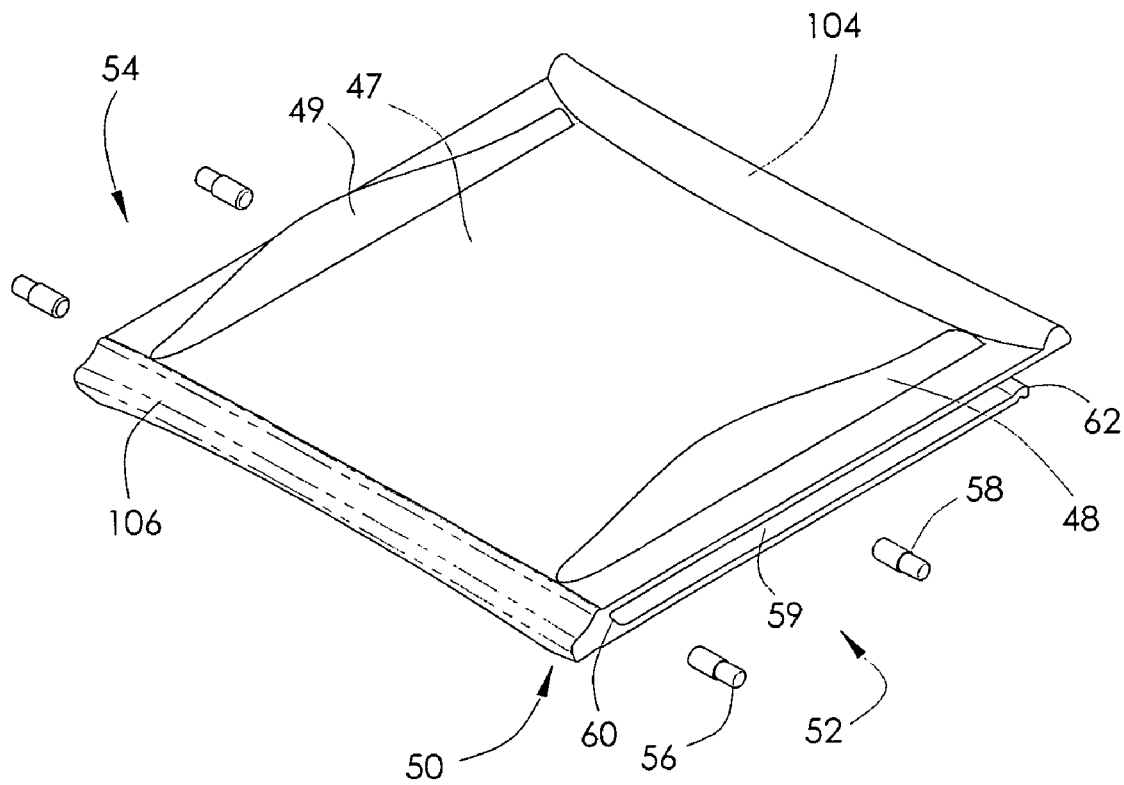
FIG. 2 is a pictorial view of another media storage organizer which is constructed according to another embodiment of the invention, the shelf being illustrated disassembled from the support structure.
Figure 3:
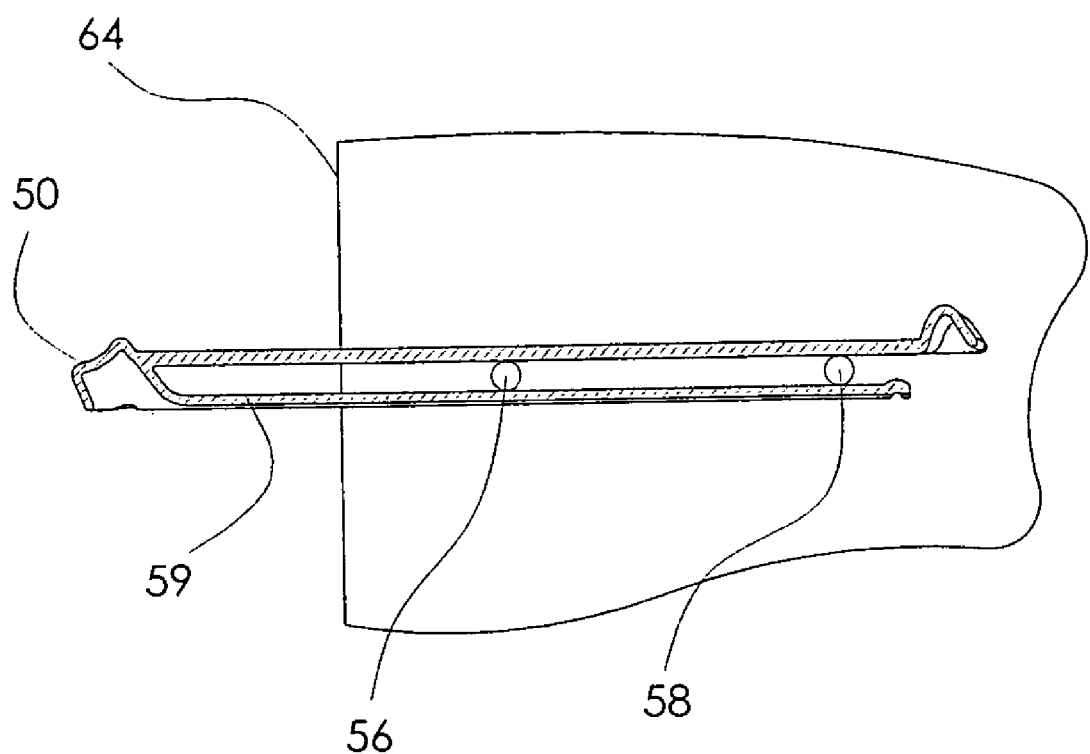
FIG. 3 is a side elevational view of the media object organizer of FIG. 2 with the support structure being illustrated in broken lines.

Referring now to FIG. 2, the sliding media object support 47 may contain a rear upstanding flange 104 for helping retain the collection of media objects 70 stored on the support 47 when it is moved to its display position. Likewise, a front upstanding flange 106 also helps retain the collection 70 of media objects on the sliding media object support 47. The front upstanding flange may also serve as a handle for the user to either pull the support 47 in a forward direction or push the support 47 in a rearwardly direction for storage thereof.

With reference to FIG. 5, the organizer 50 is shown in an extended display position where the collection of media objects 70 may be more readily viewed and flipped from side to side about their bottom edges. The upper media object support 120 is depicted in a recessed storage position between the upright walls 64 (FIG. 4) and 65.

The organizer 120 may contain a forward pin 126 corresponding to pin 56, and a rear pin 128 corresponding to the rear pin 58. The front pins 56 and 126 are horizontally spaced from the respective rear pins 58 and 128 by a multiple of approximately 32 mm represented by the distance D. This multiple of 32 mm may be important in that horizontal multiples of 32 mm are generally a standard in the furniture industry for mounting components therein. Therefore, by having the first pin 56 and the second pin 58 being separated by a multiple of 32 mm, the sliding media object organizer 50 may be permitted to be slidably mounted within an existing piece of furniture or other support structure in a convenient manner.

Likewise, furniture has been commonly manufactured so that mounting holes for the lower row of pins 56 and 58 are spaced from the row of upper pins 126 and 128 vertically by a distance H, which is a multiple of 32 mm as well. Therefore, the upper organizer 120 may be vertically separated from the lower organizer 50 by a multiple of 32 mm as represented by the distance H shown in FIG. 5. However, other hole spacing may also be employed for certain applications without departing from the present invention.

Figure 6:
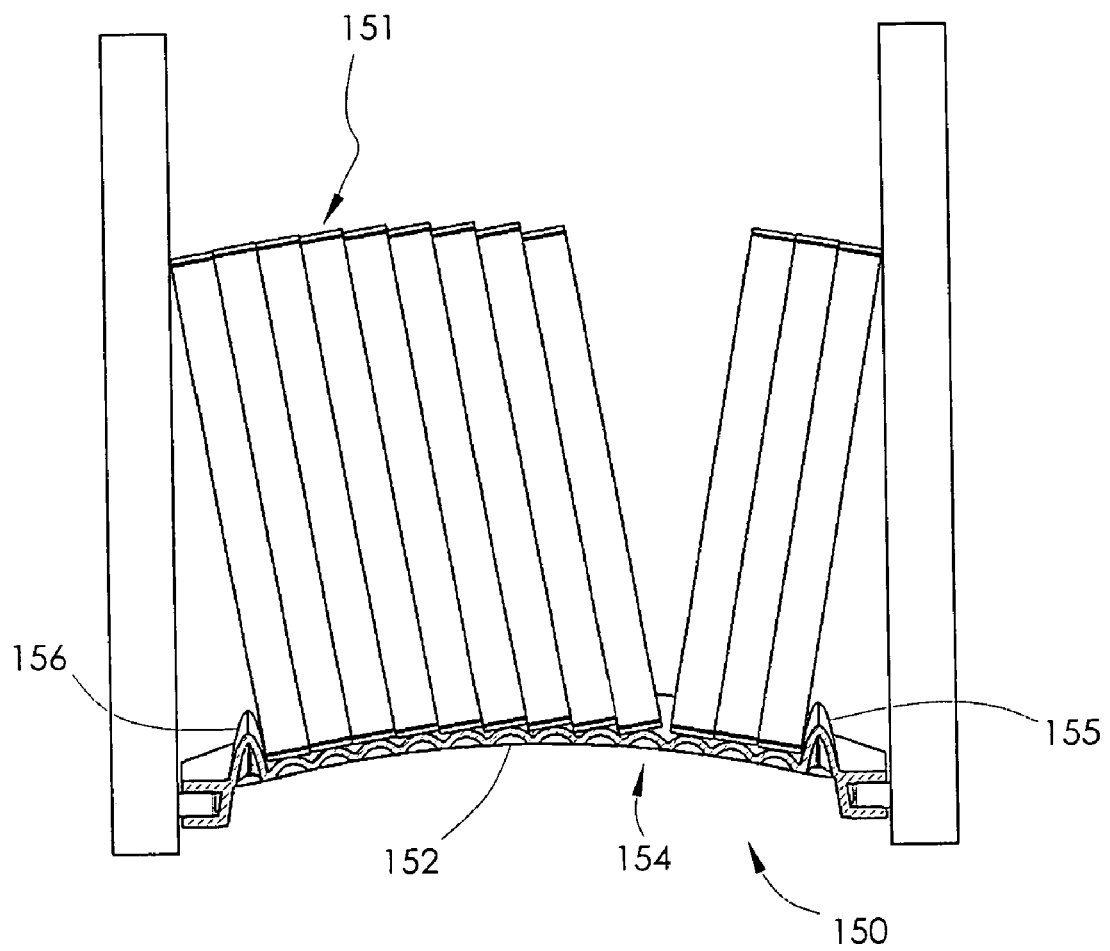
FIG. 6 is a front elevational view of another media storage organizer, which is constructed according to another embodiment of the invention.
Figure 7:
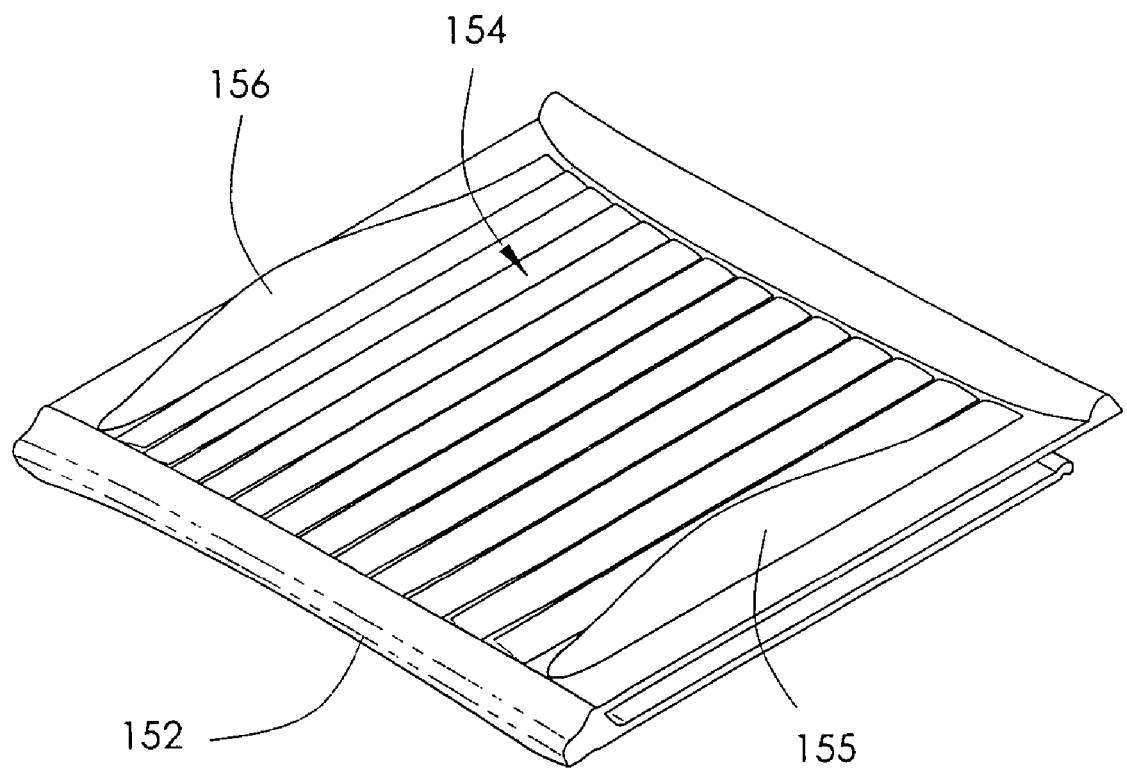
FIG. 7 is a pictorial view of the media object organizer of FIG. 6, illustrating it disassembled from its support structure.

With reference to FIGS. 6 and 7, there is shown a media storage organizer 150, which is constructed according to another embodiment of the invention, and which is similar to the organizer 10 of FIG. 1, except that the organizer 150 includes a series of crowned surfaces to facilitate the flipping of the media objects. The organizer 150 includes a media object support 152 which is remarkably similar to the media object support 12 (FIG. 1), except that the media object support 152 contains a series of crowned semi-circular surfaces 154 as best shown in FIG. 7. The crowned surfaces serve to facilitate the flipping of a collection 151 of media objects (FIG. 6.) disposed on the media object support 152. The crowned surfaces each extend between the front and rear of the support 152 between a pair of upright retainers 155 and 156 which are similar to the retainers 22 and 23 of FIG. 1.

Figure 8:
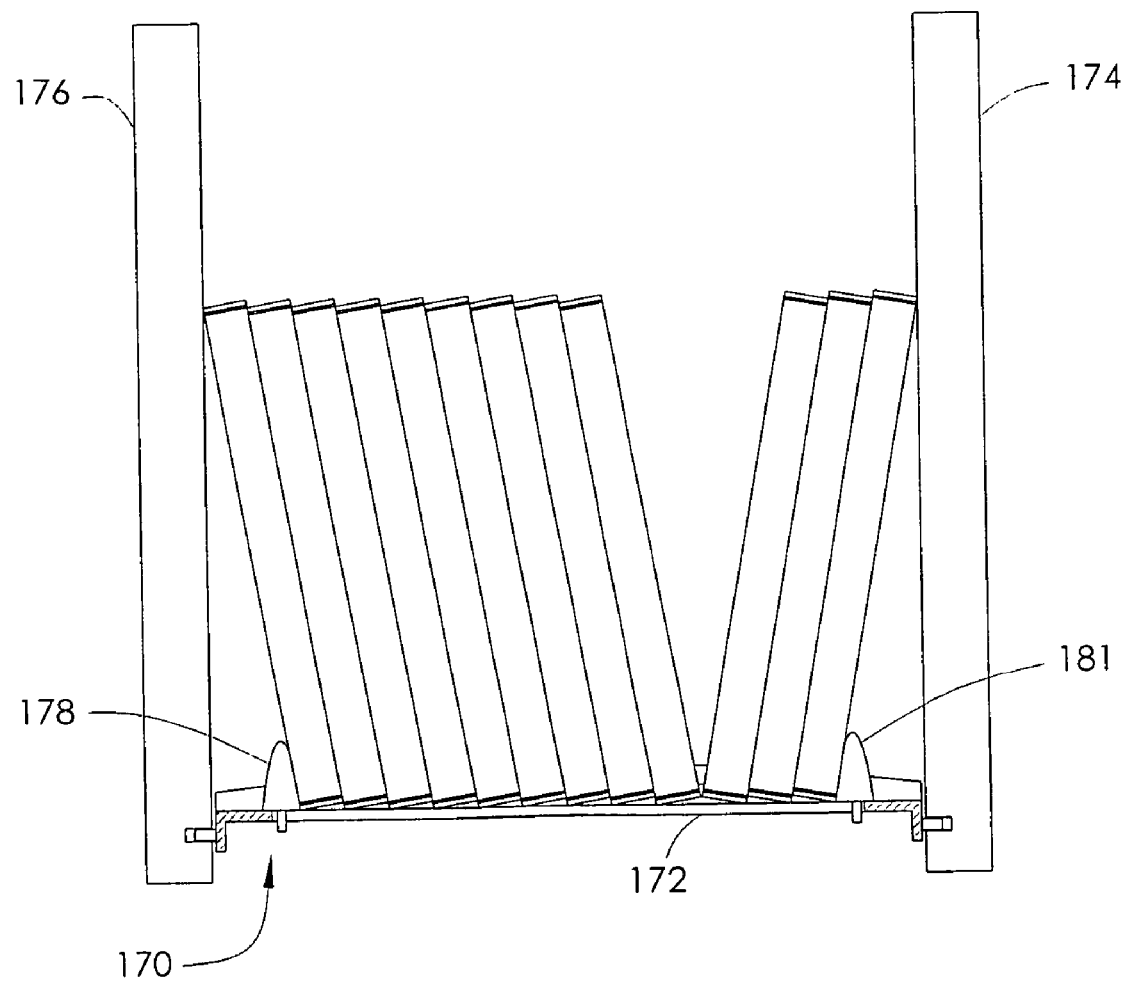
FIG. 8 is a front elevational view of still another media storage organizer. which is constructed according to still another embodiment of the invention.

Referring now to FIG. 8, there is shown a media storage organizer 170, which is constructed according to another embodiment of the invention, and which is similar to the media storage organizer 10 (FIG. 1), except that the media object organizer 170 contains a generally flat surface instead of an upwardly bowed and has moveably mounted retainers instead of integrally connected ones.

Similar to the media object support 12 (FIG. 1), the organizer 170 includes a generally flat media object support 172 secured transversely to both a support structure which may include a pair of upright walls 174 and 176. The support 172 is moveably mounted to the support structure, and includes a pair of upstanding retainers 178 and 181 in a similar manner as the organizer 10. However, the retainers 178 and 181 are each slideably mounted within elongated grooves (not shown) so that they can be moved adjustably to accommodate different numbers of media objects therebetween.

Figure 9:
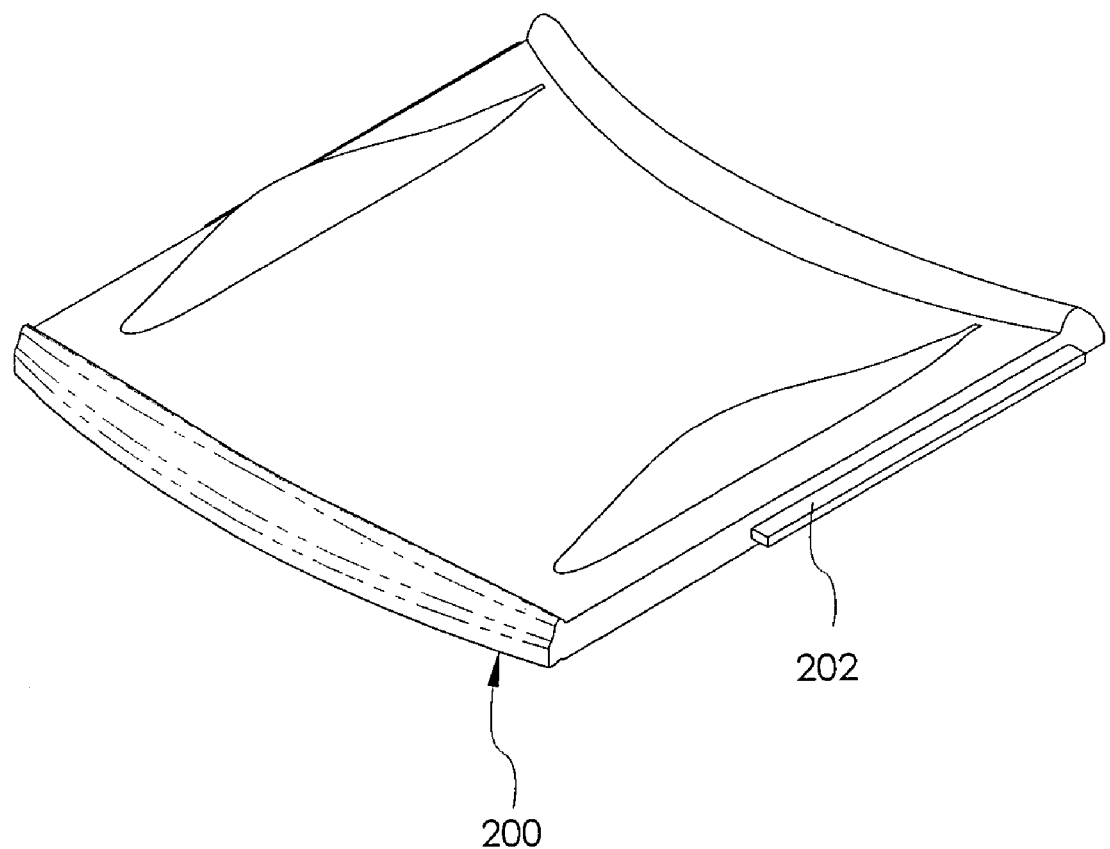
FIG. 9 is a pictorial view of yet another media object organizer of FIG. 1, which is constructed according to yet another embodiment of the invention.
Figure 10:
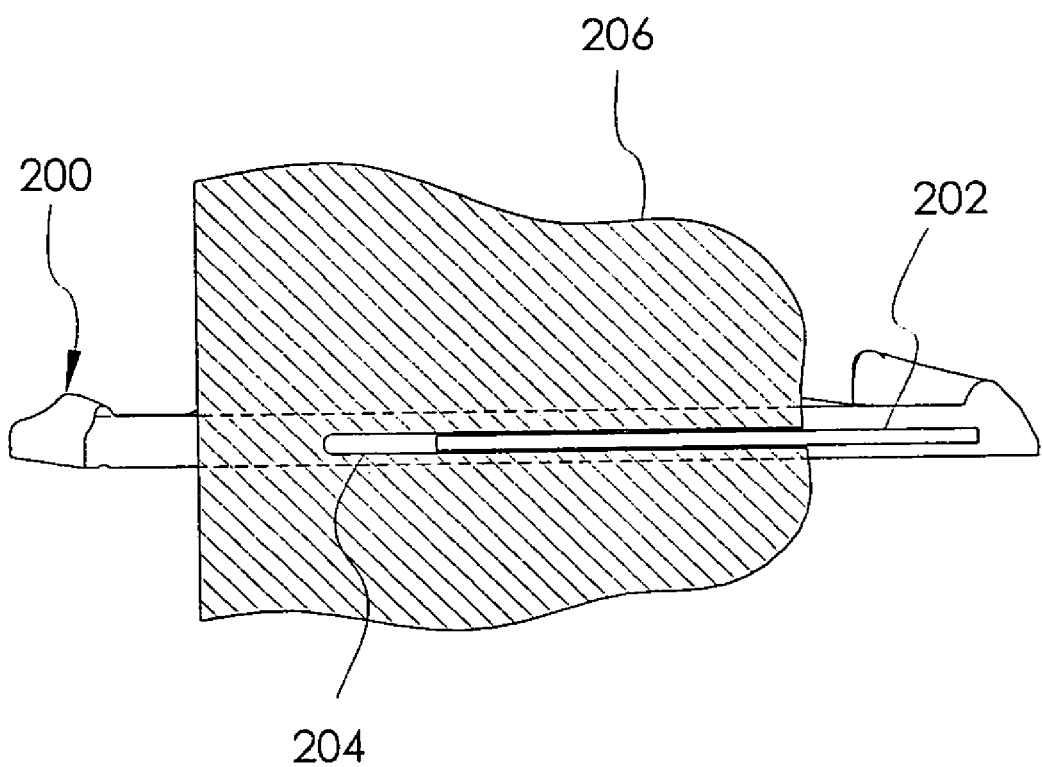
FIG. 10 is a side elevational view of the slidable media object organizer of FIG. 9, illustrating the support structure in cross section.

With reference now to FIGS. 9 and 10, there is shown a media object organizer 200, which is also constructed in accordance with a further embodiment of the invention, and which is similar to the organizer 50 (FIG. 2) except the organizer mounts are different. The organizer 200 includes an organizer mount in the form of a sliding mechanism that may include an elongated bar 202 extending from a side edge of the sliding media object organizer 200. The elongated bar may be adapted to slidably engage within an elongated groove 204 (FIG. 10) formed within an upright wall 206 of a support structure. A second sliding mechanism (not shown) may be mounted on the opposite side edge of the organizer 200 from the side portion that the elongated bar 202 is mounted. In this regard, the sliding media object support 200 may then be slidably mounted between two upright walls and operated by a user (not shown) as described heretofore.

Figure 11:
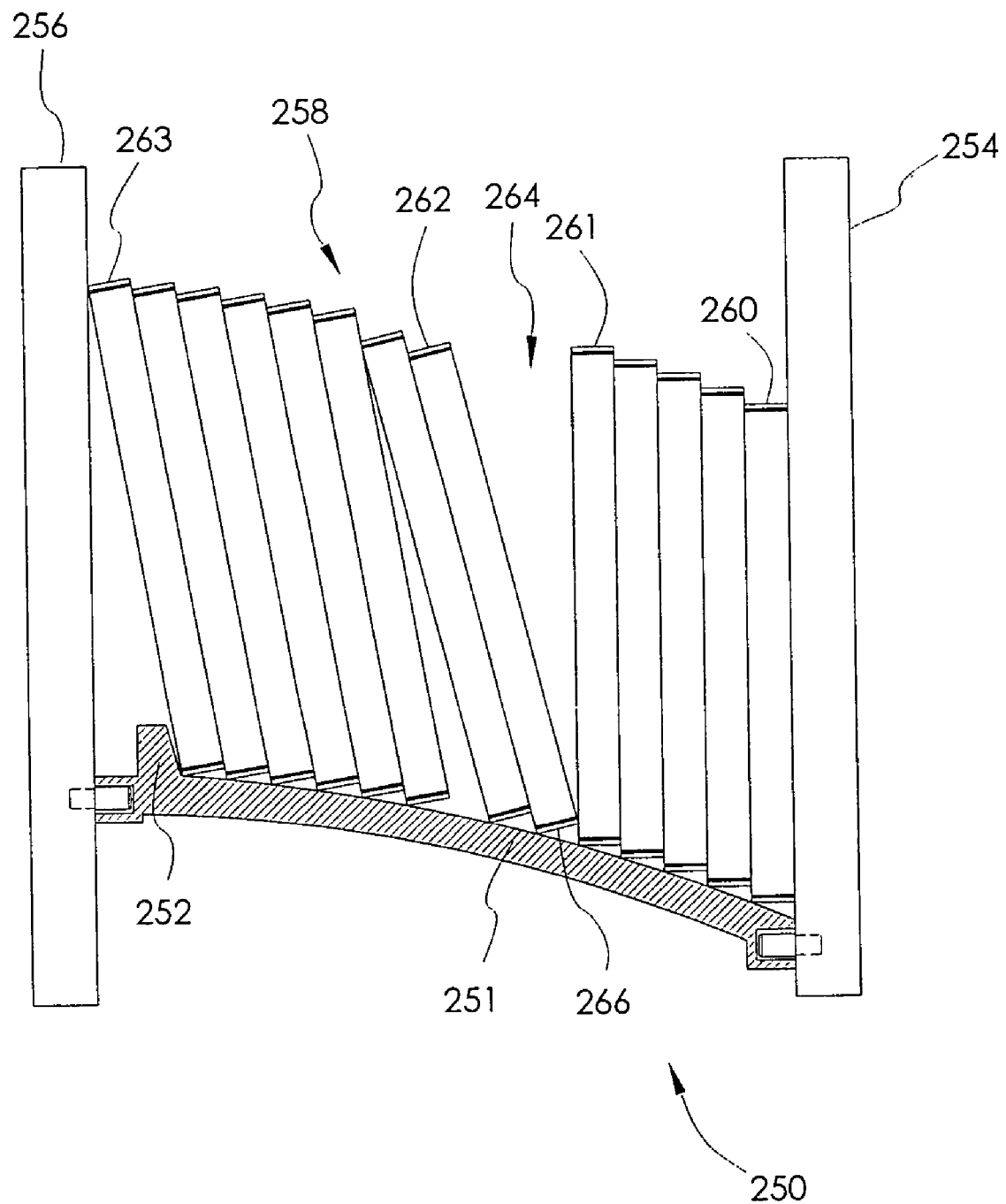
FIG. 11 is a front elevational view of a further media storage organizer, which is constructed according to a further embodiment of the invention.

Referring now to FIG. 11, there is shown a media storage organizer 250, which is also constructed in accordance with a further embodiment of the invention, and which is similar to the media object support 12 (FIG. 1) except that the media object organizer 250 may be upwardly sloped instead of being upwardly bowed. The organizer 250 includes a media object support 251 having a single retainer 252 which is similar to the retainer 22 (FIG. 1). The retainer 252 may be integrally connected to the media object support 251 or may be releasably attached thereto. A support structure including a pair of upright walls 254 and 256 transversely support the media object support 251 therebetween in a moveable manner similar to the organizer of FIG. 1.

Similar to the media storage organizer 10 (FIG. 1), the retainer 252 is horizontally spaced from the second upright wall 256 so that an end media object such as end media object 263 extends over the retainer 252 and engages the wall 256. The retainer 252 may help to limit the number of media objects that may be positioned on the media object support 251. The height of the first retainer 252 may be substantially less than the height of the media object such as end media object 263 to enable the end media object 263 to lean over the retainer 252 at an angle against the upright wall 256 while engaging the retainer 252.

In this regard, a first portion of the media objects such as a media object 263 may rest angularly on the media object support 251 and may be at least partially supported at an angular disposition by the second upright wall 256 to provide a gap 264 between the first portion and the remaining portion of the media objects to facilitate viewing the faces (not shown) of media objects at the gap 264, and to facilitate flipping of the media objects about their bottom edges such as bottom edge 266 for media object selection purposes. In this embodiment of the present invention, only one retainer, such as the retainer 252, may be provided. As a result, the media objects, such as end media object 260, may be disposed in direct contact in a vertical disposition with the upright wall 254.

Figure 12:
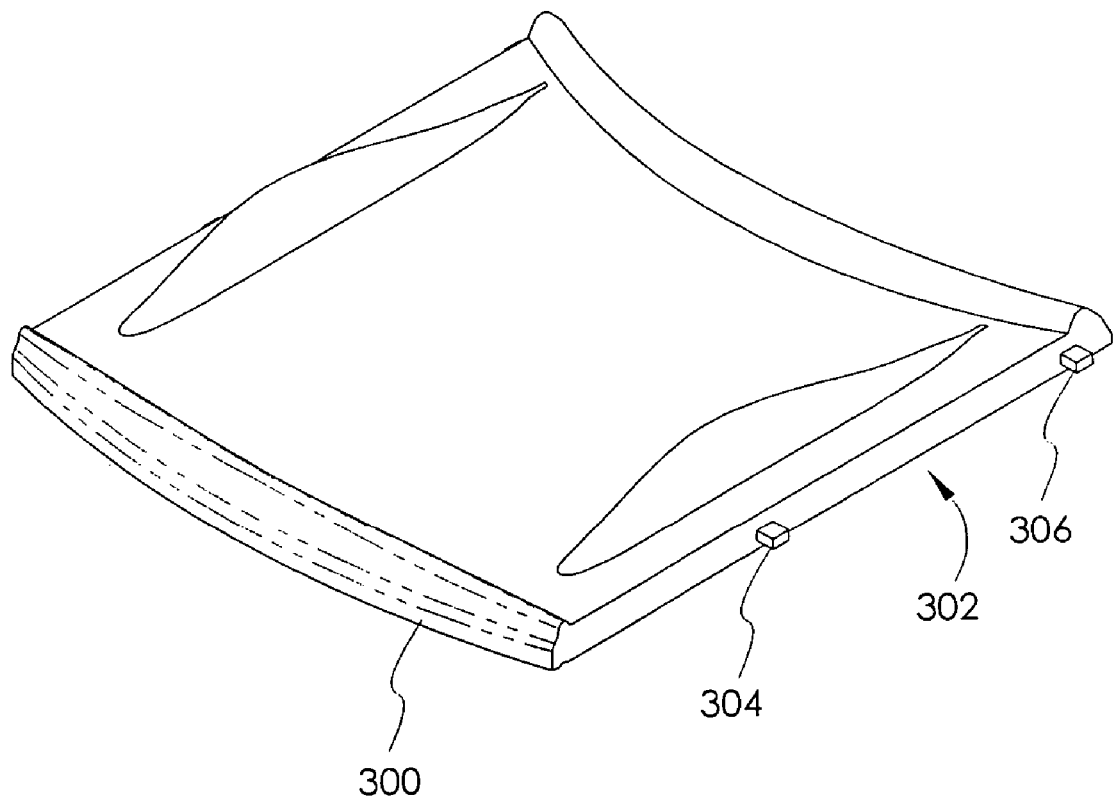
FIG. 12 is a pictorial view of still a further media object organizer of FIG. 1, which is constructed according to still a further embodiment of the invention.
Figure 13:
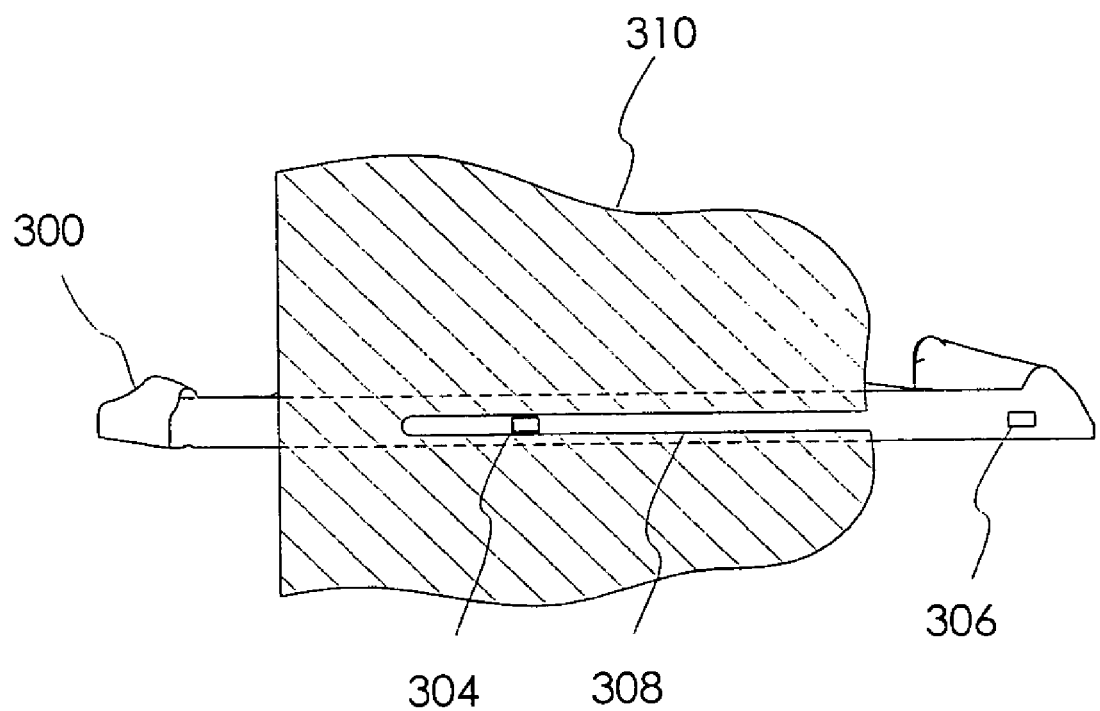
FIG. 13 is a side elevational view of the slidable media object organizer of FIG. 12, illustrating it in its display position with the support structure in section.

In another embodiment of the present invention shown in FIGS. 12 and 13, there is shown a media object organizer 300, which is similar to the organizer 200 except that nibs are provided instead of the bars. The organizer 300 includes an organizer mount in the form of a sliding mechanism 302 having a front nib 304 and a rear nib 306 extending outwardly from one of the side edges of the sliding media object support 300. Similarly, a second sliding mechanism (not shown) may be disposed on the opposite side edge of the sliding media object support 300.

The nibs 304 and 306 are adapted to be slidably mounted within an elongated groove 308 (FIG. 13) formed within a support structure such as an upright wall 310 so that the organizer 310 may be transversely and slidably mounted to the upright wall 310 and operated by the user as described heretofore in conjunction with other embodiments of the present invention.

Figure 14:
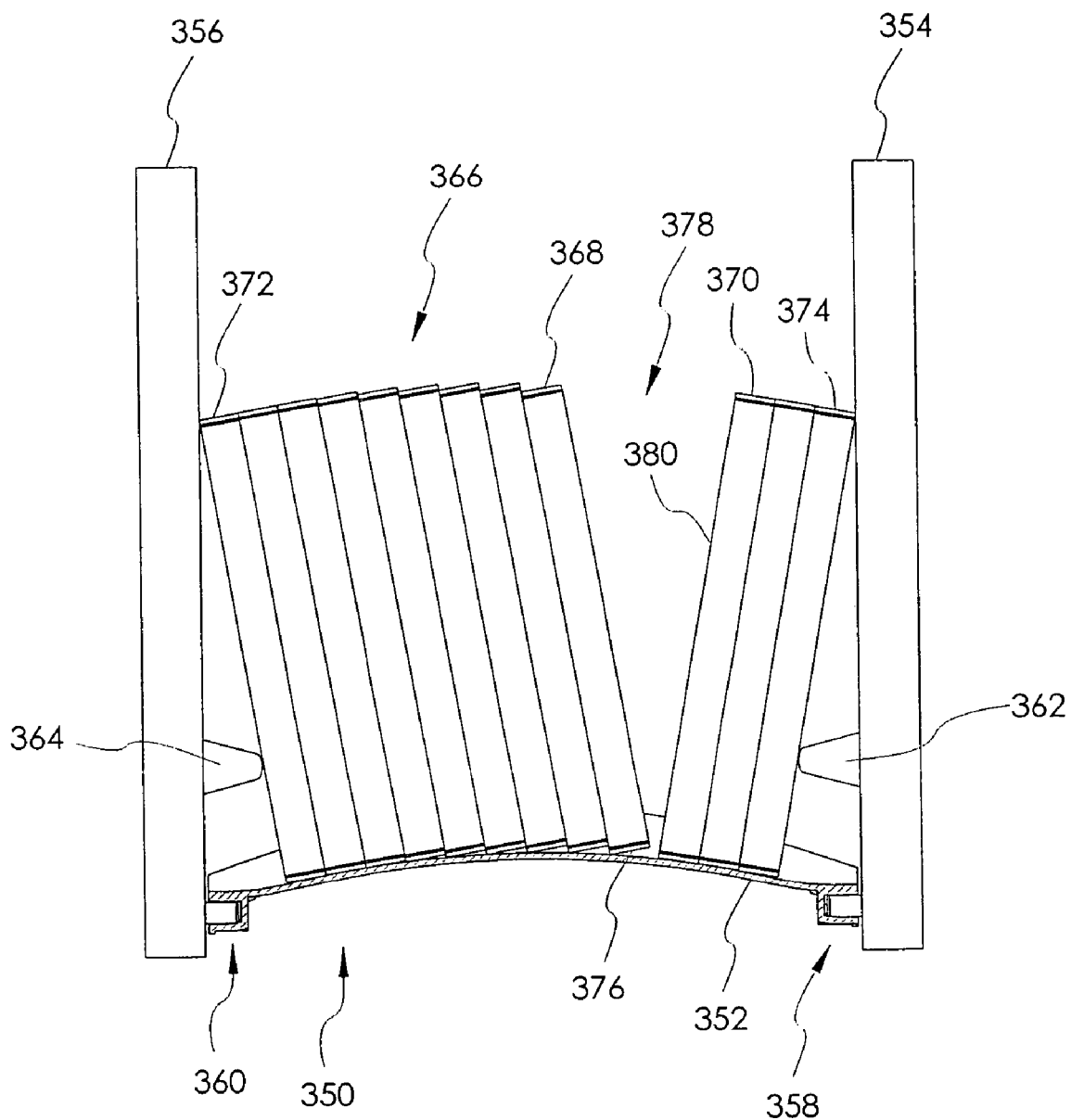
FIG. 14 is a front elevational view of yet a further media storage organizer, which is constructed in accordance with yet a further embodiment of the invention.

Referring now to FIG. 14, there is shown a media storage organizer 350 which is constructed according to another embodiment of the invention, and which is similar to the media organizer 10, except that the retainers are mounted on the support structure, such as upright walls 354 and 356. The organizer 350 includes a media object support 352, which may be upwardly bowed, and which may be transversely supported between the upright walls 354 and 356 via a first organizer mount shown generally indicated at 358 and a second organizer mount shown generally at 360 for enabling slidable movement of the support between a pulled out display position and a storage position between the walls 354 and 356.

A retainer 362 may be either integrally connected to the upright wall 354 or removably attached thereto. Likewise, a retainer 364 may be integrally connected to the wall 356 or removably attached thereto. The retainers 362 and 364 may engage end media objects such as end media object 372 and 374 to help limit the number of media objects positioned on the media object support 352 in a similar manner as the retainer 22 and 23 of FIG. 1.

In operation, a user may place a collection of media objects shown generally at 366 onto the media object support 352 in a generally vertically disposed side-by-side arrangement. The collection of media objects 366 include media objects 368 and 370 which may be separated at the V-shaped gap 378 at an intermediate position of the collection 366 of media objects. The collection of media objects 366 may further include end media objects 372 and 374 which may lean angularly against the respective upright walls 356 and 354. The media objects, such as media object 368, include a bottom edge 376 about which the object 368 may be flipped to an adjusted position (not shown) against the adjacent object 370 during a selection process undertaken by the user.

A first portion of the collection of media objects 366 rests angularly on the media object support 352 and may be at least partially supported at an angular disposition by the upright wall 354 to help define the gap 378 between the first portion and the remaining portion of the collection of media objects 366 leaning angularly against the wall 356, to facilitate viewing the faces such as a face 380 of the media object 368 at the gap 378. The gap also facilitates flipping manually the media objects about their bottom edges such as bottom edge 376 for media object selection purposes in a similar manner as heretofore described in connection with the other embodiments.

Figure 15:
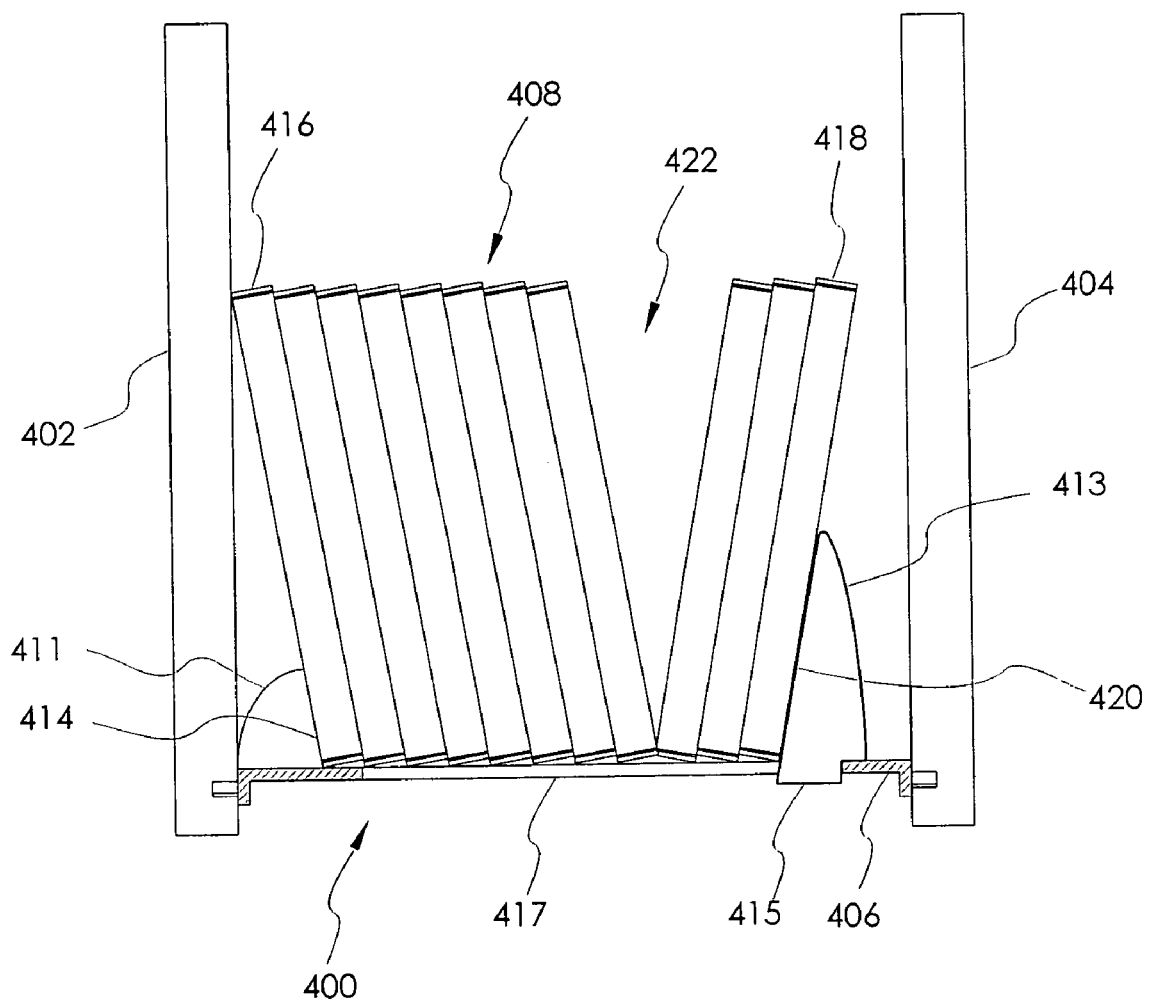
FIG. 15 is a front elevational view of yet another media storage organizer, which is constructed in accordance with yet a further embodiment of the invention.

Referring now to FIG. 15, there is shown a media storage organizer 400, which is constructed in accordance with yet another embodiment of the invention, and which is similar to the media organizer 10, except that one of the retainers is disposed at the end of the support and the other retainer is movably adjustable to help accommodate larger collections of media objects. The organizer 400 includes a media object support 406, which is generally flat, and which may be transversely supported slidably by a support structure such as upright walls 402 and 404 in a similar manner as the organizer 10 of FIG. 1. A collection 408 of media objects is adapted to rest on top of the support 406 between a pair of retainers 411 and 413 in a similar manner as the retainers 22 and 23 of the organizer 10. However, the retainer 411 is disposed at the marginal end of the support 406 adjacent to the wall 402. The retainer 411 has angular face 414 which is adapted to engage an end media object such as a media object 416. The retainer 411 is integrally connected to the support 406, but it is to be understood that it may also be movably attached to the support, if desired.

The retainer 413 has a tab or runner 415 at its bottom to fit into a slot or groove 417 in the support 406 extending between the retainers 411 and 413. In this manner, if a fewer number of media objects are stored on the support 406, the retainer 413 can be moved adjustably along the slot 417 to engage an end media object 418. The movable retainer 413 has an angular face 420 to engage the end media object 418 at an angle to cause a V-shaped gap 422 to be formed at an intermediate portion of the media object collection 408 in a similar manner as the gap is formed in the media for the organizer 10 of FIG. 1.

It should be noted that the height of the retainer 420 is sufficiently taller than the height of the fixed retainer 411 to enable the end media object 418 to be supported thereby without contacting the adjacent wall 404. The rear end of the slot 417 serves as a stop to ensure that a limited number of media objects can be stored on the support 406 to cause a V-shaped gap to be formed between an adjacent pair of media objects.

Figure 16:
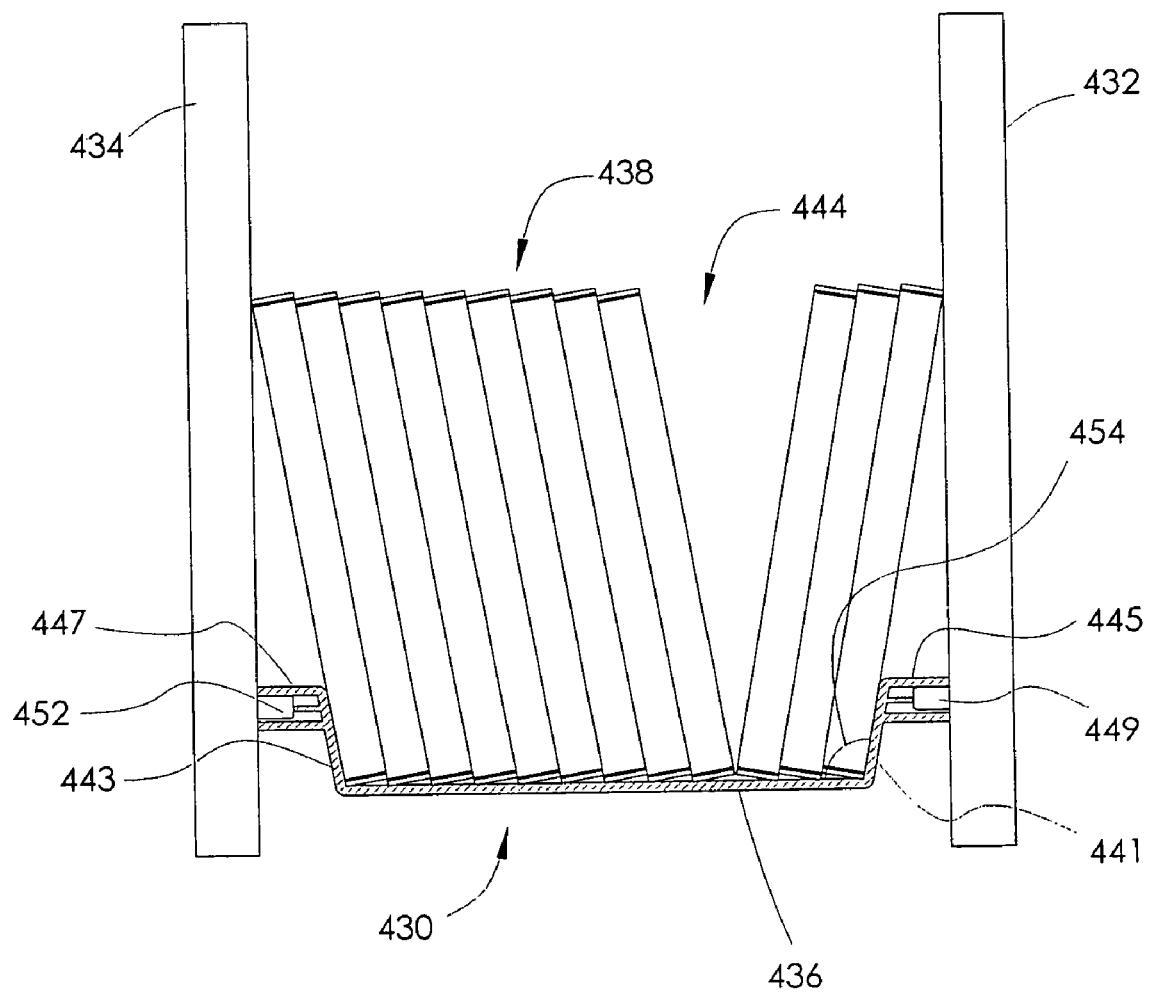
FIG. 16 is a front elevational view of yet a further media storage organizer, which is constructed in accordance with yet a further embodiment of the invention.

Referring now to FIG. 16, there is shown a media storage organizer 430, which is constructed according to a further embodiment of the invention, and which is similar to the media organizer 10, except that the retainers are formed by upturned walls or flanges of the media object support. The organizer 430 includes a media object support 436, which is generally flat and which is transversely supported by a support structure such as a pair of upright walls 432 and 434. A collection 438 of media objects are supported on top of the support 436 between a pair of retainers 441 and 443, which are similar to the retainers 22 and 23 of the organizer 10 of FIG. 1. The retainers 441 and 443 are angularly upturned walls or flanges forming a part of the support 436. The retainers 441 and 443 are angularly inclined in a similar manner as the retainers 22 and 23 of FIG. 1. To cause the media objects to lean against the walls 432 and 434 to form a V-shaped gap 444 in the media object collection 38 in a similar manner as described in connection with the organizer 10.

A pair of organizer supports 445 and 447 are slotted to receive respective mounting pins 449 and 452 extending inwardly from the respective walls 432 and 434 to enable the organizer 430 to be movable relative to the support structure walls 432 and 434 in a similar manner as heretofore described in connection with the embodiments of the invention.

Each one of the retainers 441 and 443 is upstanding and inclined from a horizontal plane by an angle such as an angle 454 between the retainer 441 and the bottom wall of the support 436 as indicated in FIG. 16. The retainer angle such as the angle 454 helps define the lean angle of the media objects. The retainer angle may be sufficiently close to 90 degrees to ensure that the retainers limit lateral movement of the media objects. In this regard, should the retainer angle such as the angle 454 be substantially larger than as illustrated in FIG. 16 such as approaching 180 degrees, the media objects may no longer be retained and could rest on top of the retainer instead of retaining the media objects.

Figure 17:
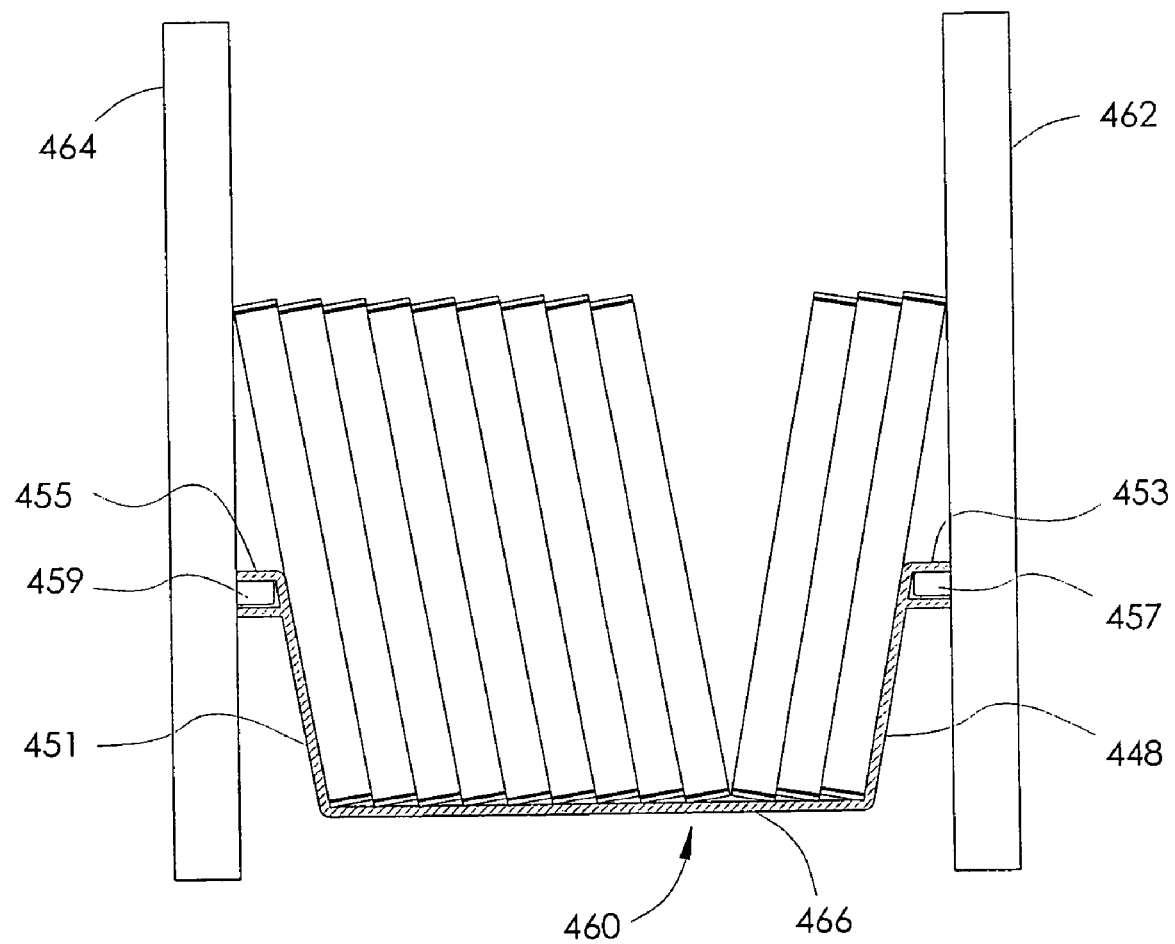
FIG. 17 is a front elevational view of yet a still further media storage organizer, which is constructed in accordance with yet a still further embodiment of the invention.

Referring now to FIG. 17, there is shown still another media storage organizer 460, which is constructed according to another embodiment of the invention, and which is similar to the media organizer 430 of FIG. 16, except that the retainers are substantially taller in height. The organizer 460 is slidably mounted to a support structure including a pair of parallel spaced-apart upright walls 462 and 464. The organizer 460 includes a support 466 which is similar to the support 436 (FIG. 16). The support 466 has a pair of retainers 448 and 451, which are similar to the retainers 441 and 443, except that the retainers 448 and 451 are substantially taller than the height of the retainers 441 and 443 to provide greater support for the media objects.

A pair of organizer supports 453 and 455 are similar to the supports 445 and 447 of FIG. 16, and are slotted to receive a pair or respective mounting pins 457 and 459 in a similar manner as the organizer mounts 445 and 447 of FIG. 16.

While the particular embodiments of the present invention have been disclosed, it is to be understood that various different modifications are possible and are contemplated within the true spirit and scope of the appended claims. For example, the media storage organizers may be formed of any rigid or semi-rigid type material such as plastic, metal, wood or other. There is no intention, therefore, of limitations to the exact abstract or disclosure herein presented.

What is claimed is:

1. A media storage organizer for attachment to a support structure to hold media objects, the support structure having a pair of first and second vertical parallel spaced apart walls, comprising:

a generally planar horizontal media object support extending between the first and second walls for helping support a group of the media objects from below, the support having a width substantially equal to the distance extending between the first and second walls;

at least one organizer mount for securing first and second ends of the support to the respective spaced apart first and second walls of the support structure in a generally horizontal position;

a first elongated retainer projecting upwardly from the support and extending substantially between the front and rear edges thereof, the first retainer having an angled surface spaced a predetermined distance X from the first end of the support for engaging a first end media object to help limit the number of media objects positioned on the support;

a second elongated retainer projecting upwardly from the support and extending substantially between the front and rear edges thereof, the second retainer having an angled surface spaced the predetermined distance X from the second end of the support for engaging a second end media object to help limit the number of media objects positioned on the support;

the height of the first and second retainers each being substantially less than one tenth of the width of the support to retain the media objects spaced away from the support structure;

the height of the first and second retainers each being less than the distance X to permit the first and second end media objects to lean at an angle over the respective first and second retainers against the respective first and second walls of the support structure while engaging the respective first and second retainers;

wherein one portion of the media objects resting on the support can be at least partially supported by one of the first and second walls of the support structure and the other portion can be supported by the other one of the first and second walls of the support structure to provide a gap between adjacent pairs of the media objects; and the first and second retainers each being spaced by the predetermined distance X from the respective first and second ends of the support to provide the gap with spacing for convenient viewing of selected media objects.

2. A media storage organizer as recited in claim 1, wherein the organizer mount enables the media object support to move relative to the support structure in a generally horizontal plane between a display position and a stored position.

3. A media storage organizer as recited in claim 2, wherein the organizer mount includes an elongated groove in one of the walls or a side edge of the media object support, and at least one pin extending between the support structure and the side edge for engagement slidably within the groove.

4. A media storage organizer as recited in claim 2, wherein the organizer mount includes an elongated groove in one of the walls or a side edge of the media object support, and at least one slide bar extending between the support structure and the side edge for engagement slidably within the groove.

5. A media storage organizer as recited in claim 2, further including at least one stop for helping to limit the back and forth path of travel of the media object support.

6. A media storage organizer as recited in claim 1, wherein the media object support further includes a rear upstanding flange.

7. A media storage organizer as recited in claim 1, wherein the media object support further includes a front upstanding flange disposed on the front of the media object support.

8. A media storage organizer as recited in claim 1, wherein the media object support further includes a series of crowned surfaces to facilitate flipping of the media objects.

9. A media storage organizer as recited in claim 1, wherein the media object support is upwardly curved.

10. A media storage organizer as recited in claim 1, wherein the media object support is generally flat.

11. A media storage organizer as recited in claim 1, wherein the retainer is connected to the support structure.

12. A media storage organizer as recited in claim 1, wherein the retainer is integrally connected to the media object support.

13. A media storage organizer as recited in claim 1, wherein the media storage organizer is at least partially composed of plastic material.

14. A media storage organizer according to claim 1, wherein the retainer is adjustably movably mounted on the support.

15. A media storage organizer according to claim 1, wherein the retainer is an angular flange of the support, the flange being upwardly inclined at an angle to retain the media objects from lateral movement.

16. A media storage organizer as defined in claim 1 wherein the distance between the widest portion of the gap between adjacent pairs of the media objects is equal to about 2X.

* * * * *